United States Patent
Sakai

(10) Patent No.: US 8,044,620 B2
(45) Date of Patent: Oct. 25, 2011

(54) DRIVING APPARATUS FOR MULTI-PHASE AC SYNCHRONOUS MOTOR

(75) Inventor: Koji Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 12/458,487

(22) Filed: Jul. 14, 2009

(65) Prior Publication Data

US 2010/0026220 A1 Feb. 4, 2010

(30) Foreign Application Priority Data

Aug. 1, 2008 (JP) ................................. 2008-199711
Dec. 2, 2008 (JP) ................................. 2008-307524

(51) Int. Cl.
*H02P 27/08* (2006.01)
(52) U.S. Cl. ............ 318/400.17; 318/400.3; 318/400.9; 318/400.32; 363/69; 363/132
(58) Field of Classification Search ............ 318/400.17, 318/139, 519, 400.03, 400.09, 400.11, 400.32; 363/69, 132
See application file for complete search history.

(56) References Cited

U.S. PATENT DOCUMENTS

| | | | |
|---|---|---|---|
| 6,137,704 A | 10/2000 | Ito et al. | |
| 6,320,775 B1 | 11/2001 | Ito et al. | |
| 6,548,984 B2 * | 4/2003 | Shamoto et al. | 318/801 |
| 7,016,207 B2 * | 3/2006 | Yamanaka et al. | 363/98 |
| 7,068,526 B2 * | 6/2006 | Yamanaka et al. | 363/98 |
| 7,714,624 B2 * | 5/2010 | Takasu et al. | 327/110 |
| 7,729,146 B2 * | 6/2010 | Hayami et al. | 363/98 |
| 2005/0128777 A1 * | 6/2005 | Yamanaka et al. | 363/98 |
| 2005/0258796 A1 * | 11/2005 | Kusaka | 318/801 |
| 2008/0265975 A1 * | 10/2008 | Takasu et al. | 327/374 |
| 2009/0237020 A1 * | 9/2009 | Sakai | 318/400.11 |
| 2009/0256506 A1 * | 10/2009 | Sakai | 318/400.09 |
| 2010/0019712 A1 * | 1/2010 | Morino et al. | 318/434 |

(Continued)

FOREIGN PATENT DOCUMENTS

JP   A-2002-153090 A   5/2002

(Continued)

OTHER PUBLICATIONS

Office Action mailed Jun. 22, 2010 from the Japanese Patent Office in the corresponding JP Patent Application No. 2008-307524 (English translation).

*Primary Examiner* — Paul Ip
(74) *Attorney, Agent, or Firm* — Posz Law Group, PLC

(57) ABSTRACT

An inverter control circuit controls transistors based on comparison of a voltage command wave with a carrier wave, when a magnitude of a voltage vector is equal to or less than a peak value of the carrier wave. The voltage command wave is a wave, which is offset to a maximum value side from a reference potential of the carrier wave so that a maximum value of the voltage command wave equals a peak value of the carrier wave. The inverter control circuit makes an on-period of the transistor on a positive bus side longer than that of the transistor on a negative bus side by using the command voltage. The amount of electricity charged in a capacitor is reduced in comparison with a case in which the voltage command wave is used. Thus, thermal loss of a stator coil and a diode on the positive bus side is reduced.

16 Claims, 12 Drawing Sheets

U.S. PATENT DOCUMENTS

| | | | |
|---|---|---|---|
| 2010/0110743 A1* | 5/2010 | Yamasaki | 363/132 |
| 2010/0231153 A1* | 9/2010 | Sakai | 318/400.32 |
| 2010/0320945 A1* | 12/2010 | Taniguchi et al. | 318/400.02 |
| 2011/0031922 A1* | 2/2011 | Sakai et al. | 318/519 |
| 2011/0050136 A1* | 3/2011 | Sumi et al. | 318/400.3 |
| 2011/0140642 A1* | 6/2011 | Kono et al. | 318/139 |

FOREIGN PATENT DOCUMENTS

| | | |
|---|---|---|
| JP | A-2002-272183 | 9/2002 |
| JP | A-2002-291256 | 10/2002 |
| JP | A-2005-269722 A | 9/2005 |

\* cited by examiner

| | T1 | T2 | T3 | T4 | T5 |
|---|---|---|---|---|---|
| ω1 | ΔV1 | ΔV2 | ΔV3 | ΔV4 | ΔV5 |
| ω2 | ΔV6 | ΔV7 | ΔV8 | ΔV9 | ΔV10 |
| ω3 | ΔV11 | ΔV12 | ΔV13 | ΔV14 | ΔV15 |
| ω4 | ΔV16 | ΔV17 | ΔV18 | ΔV19 | ΔV20 |

DRIVING APPARATUS FOR MULTI-PHASE AC SYNCHRONOUS MOTOR

CROSS REFERENCE TO RELATED APPLICATION

This application is based on and incorporates herein by reference Japanese Patent Applications No. 2008-199711 filed on Aug. 1, 2008 and No. 2008-307524 filed on Dec. 2, 2008.

FIELD OF THE INVENTION

The present invention relates to a driving apparatus for a multi-phase AC synchronous motor having a star-connected stator coil.

BACKGROUND OF THE INVENTION

A conventional driving apparatus for a three-phase alternating current (AC) synchronous motor has, as disclosed in JP 3223842 (U.S. Pat. No. 6,137,704 and U.S. Pat. No. 6,320,775) for example, an inverter circuit for outputting three-phase AC currents of the motor and an inverter control circuit for controlling the inverter circuit.

In the inverter circuit, three sets of paired transistors, which are connected in series in each phase, are connected in parallel one another between a positive bus line and a negative bus line. A diode is connected to each transistor in parallel and in reverse bias direction in the inverter circuit.

A direct current (DC) power source is connected between the neutral point of the stator coil and the negative bus line of the inverter circuit. A capacitor is connected between the positive bus line and the negative bus line of the inverter circuit.

The inverter control circuit is configured to drive the six transistors to perform switching operation, so that the three-phase AC currents are supplied to the motor based on a voltage difference between the positive bus line and the negative bus line.

When the transistor is turned on, a current flows from the DC power source to the stator coil so that the stator coil stores energy based on the current.

When the transistor is turned off, the stored energy is discharged as a current, which flows from the stator coil to the positive electrode of the capacitor through the diode provided and the positive bus line. Thus, by the switching operation of the six transistors, the three-phase currents are supplied to the stator coil and the capacitor is charged.

When the capacitor is charged with the current, which flows from the stator coil, thermal loss is generated in the stator coil.

As the charge to be stored in the capacitor by the switching operation of the transistors increases, the thermal loss of the stator coil increases. As a result, efficiency in driving the motor is degraded.

SUMMARY OF THE INVENTION

It is therefore an object of the present invention to provide a driving apparatus for a multi-phase AC synchronous motor, which improves efficiency in driving the motor.

According to the present invention, a driving apparatus is provided for a multi-phase AC synchronous motor, which has a stator coil energized by a DC power source and a capacitor through an inverter circuit. The inverter circuit includes a positive-side switching element and a negative-side switching element connected in series as a pair. The switching elements are controlled by an inverter control circuit.

In one aspect, the inverter control circuit is configured to turn on the negative-side switching element to store energy in a stator coil by a current flowing from the DC power source to the stator coil, and turn off the negative-side switching element to charge the capacitor by the energy of the stator coil, which flows as a current flowing from the stator coil to the positive electrode of the capacitor bypassing the positive-side switching element. In this case, the inverter control circuit is configured to shorten a turn-on period of the negative-side switching element than a turn-on period of the positive-side switching element.

In another aspect, the inverter control circuit is configured to turn on the positive-side switching element to store energy in the stator coil by a current flowing from the DC power source to the stator coil through the positive-side switching element, and turn off the positive-side switching element to charge the capacitor by the energy of the stator coil, which flows as a current flowing from the negative electrode of the capacitor bypassing the negative-side switching element. In this case, the inverter control circuit is configured to shorten a turn-on period of the positive-side switching element than a turn-on period of the negative-side switching element.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

The present invention will be described in more detail with reference to various embodiments.

First Embodiment

Figure 1:
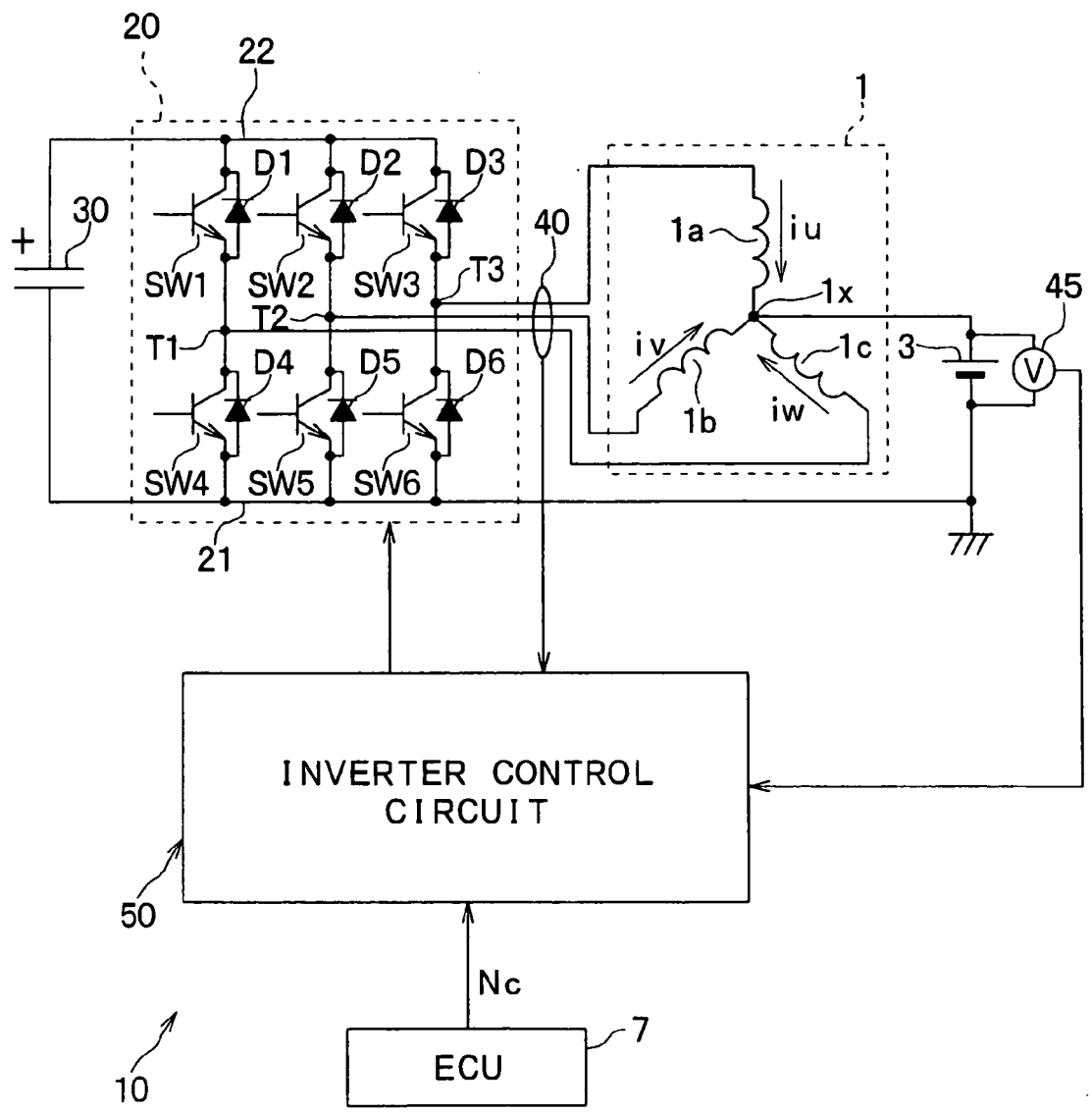
FIG. 1 is a circuit diagram showing a driving apparatus for a three-phase AC synchronous motor according to a first embodiment of the present invention.

Referring to FIG. 1, a driving apparatus 10 is provided for driving a three-phase AC synchronous motor by supplying three-phase AC currents. The motor has a rotary shaft, which is coupled to a load such as a compressor.

The motor has a rotor (not shown), in which permanent magnets are fixed, and a stator coil 1 for generating a rotating magnetic field for the rotor. The stator coil 1 has three phase coils, that is, a U-phase coil 1a, a V-phase coil 1b and a W-phase coil 1c, which are start-connected to a neutral point 1x. A DC power source 3 is connected between the neutral point 1x and the ground.

The motor has no sensors for detecting a rotational position of the rotor.

The driving apparatus 10 includes an inverter circuit 20, a capacitor 30, current sensors 40, a voltage sensor 45 and an inverter control circuit 50. The inverter circuit 20 is for outputting the three-phase AC currents to the stator coil 1 as a function of an output voltage of the DC power source 3 and an output voltage of the capacitor 30.

The inverter circuit 20 includes six transistors SW1 to SW6 and six diodes D1 to D6.

The transistors SW1 and SW4 are connected in series as one pair between a positive bus line 22 and a negative bus line 21. The transistors SW2 and SW5 are connected in series as one pair between the positive bus line 22 and the negative bus line 21. The transistors SW3 and SW6 are connected in series as one pair between the positive bus line 22 and the negative bus line 21. The negative bus line 21 is grounded.

The transistors SW1 and SW4 are provided for the W-phase, and hence a common junction T1 between the transistors SW1 and SW4 is connected to the W-phase coil 1c. The transistors SW2 and SW5 are provided for the V-phase, and hence a common junction T2 between the transistors SW2 and SW5 is connected to the V-phase coil 1b. The transistors SW3 and SW6 are provided for the U-phase, and hence a common junction T3 between the transistors SW3 and SW6 is connected to the U-phase coil 1a.

Each of the transistors SW1 to SW6 is, for example, a semiconductor transistor such as an insulated-gate bipolar transistor or a field-effect transistor. The transistors SW1 to SW3 connected to the positive bus line 22 are positive-side switching elements and, the transistors SW4 to SW6 connected to the negative bus line 21 are negative-side switching elements.

The diodes D1 to D6 are connected to corresponding transistors SW1 to SW6 in parallel and in reverse-biased direction, respectively.

The capacitor 30 is provided for supplying a DC output voltage to the inverter circuit 20 together with the DC power source 3. A positive electrode of the capacitor 30 is connected to the positive bus line 22 of the inverter circuit 20. A negative electrode of the capacitor 30 is connected to the negative bus line 21.

The current sensors 40 detect a U-phase current iu, a V-phase current iv and a W-phase current iw, respectively. The U-phase current iu flows between the common junction T3 and the U-phase coil 1a. The V-phase current iv flows between the common junction T2 and the V-phase coil 1b. The W-phase current iw flows between the common junction T1 and the W-phase coil 1c.

Each current iu, iv and iw is positive, when it flows from the inverter circuit 20 to the neutral point 1x as shown by arrows in FIG. 1.

The voltage sensor 45 is provided for detecting the output voltage between the positive electrode and the negative electrode of the DC power source 3.

The inverter control circuit 50 includes a microcomputer, a memory and the like, and executes control processing for controlling on/off switching operation of the transistors SW1 to SW6 based on detection values of the sensors 40, 45 and a target rotation speed Nc of the motor calculated by and received from an electronic control unit (ECU) 7.

Figure 2:
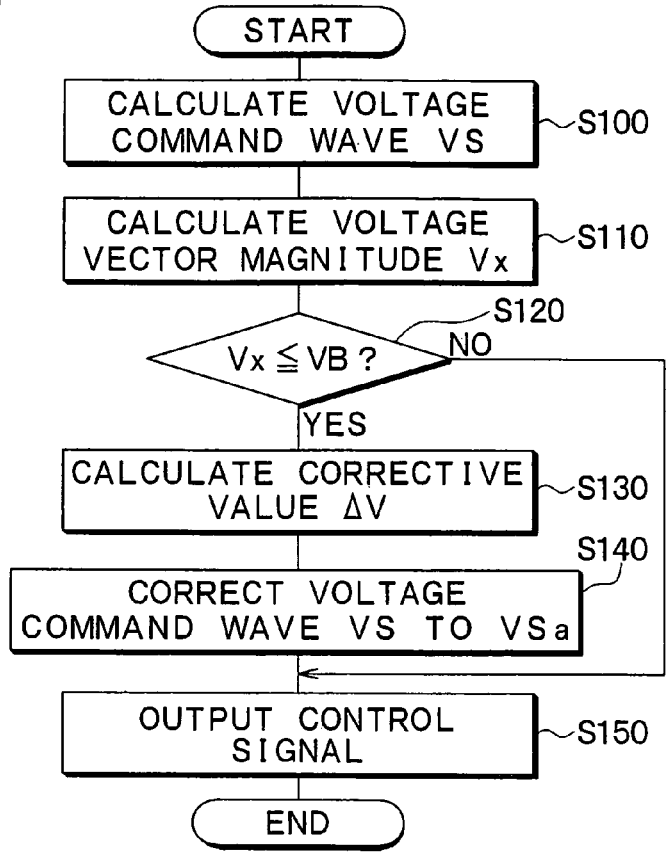
FIG. 2 is a flowchart showing control processing executed by a control circuit in the first embodiment.

The inverter control circuit 50 is configured to perform the control processing as shown in FIG. 2.

This control processing is pulse-width modulation (PWM) control processing, which is repeated at a predetermined interval.

Figure 3:
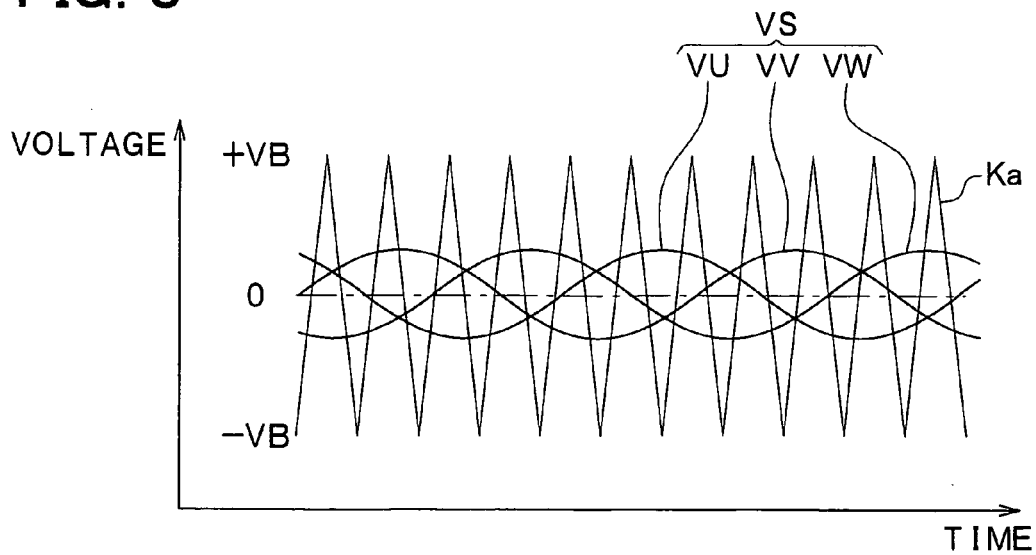
FIG. 3 is a time chart showing one example of a carrier wave and a voltage command wave used in the first embodiment.

In this PWM control processing, the inverter circuit 20 is controlled by comparison of a voltage command wave VS with a carrier wave Ka. As shown in FIG. 3, the carrier wave Ka is a triangular wave voltage, which periodically varies its magnitude to a positive side (in a positive direction) and a negative side (negative direction) from a reference potential, that is, a zero potential. A peak value of the carrier wave Ka is set to a maximum value +VB or a minimum value −VB.

First, at S100, a voltage command wave VS is calculated so that an actual rotation speed of the motor is controlled to the target rotation speed Nc. The voltage command wave VS is, for example, a command wave of a three-phase fixed coordinate, and calculated by using a conventional motor voltage equation.

The voltage command wave VS indicates a second voltage command wave of each phase. It is a three-phase voltage command wave formed by a U-phase voltage command wave VU, a V-phase voltage command wave W and a W-phase voltage command wave VW. Each voltage command wave VU, VV and VW is a sine-wave voltage, which periodically varies its magnitude to the positive side and the negative side from a reference potential, which is the same as the reference potential (second reference potential) of the carrier wave Ka.

Then, at S110, a voltage vector magnitude Vx of the voltage command wave VS is calculated.

Specifically, the voltage command wave VS of the three-phase fixed coordinate system is converted into a rotating coordinate system, that is, d-q coordinate system, to determine a voltage command wave (vd, vq) of the rotating coordinate system. The voltage command wave VS is expressed in the rotating coordinate system by vd and vq, which are components of the voltage command wave VS on the d-axis and the q-axis, respectively. The voltage vector magnitude Vx of the voltage command wave VS is determined by substituting the voltage command wave (vd, vq) of the rotating coordinate system into the following equation (1).

$$Vx=\sqrt{vd^2+vq^2} \quad (1)$$

It is checked at S120 whether the voltage vector magnitude Vx of the voltage command wave VS is equal to or less than the peak value VB of the carrier wave Ka. If the voltage vector magnitude Vx is equal to or less than the peak value VB (S120: YES), a corrective value ΔV is calculated at S130 by using the following equation (2).

$$\Delta V = VB - Vx \quad (2)$$

Figure 4:
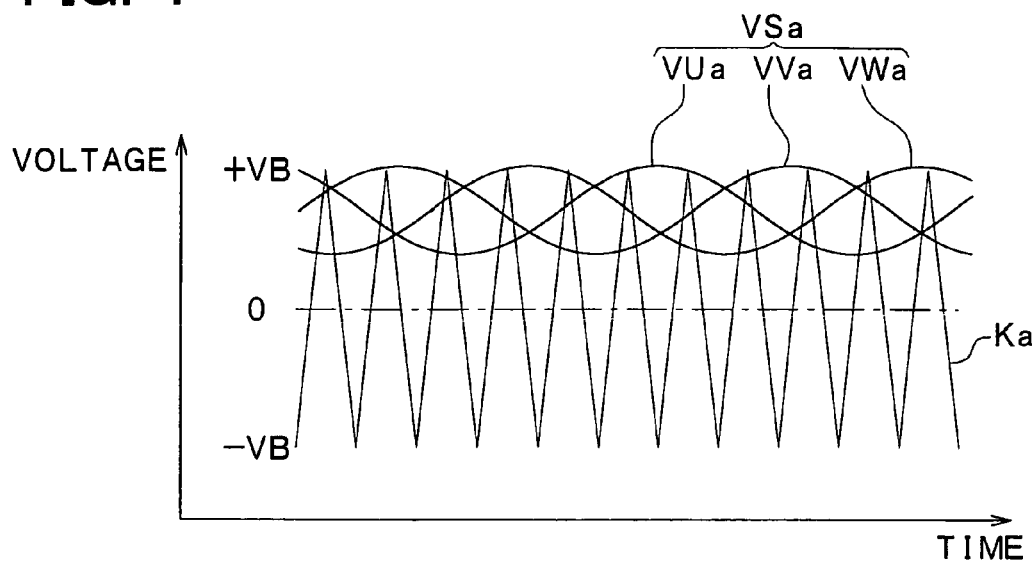
FIG. 4 is a time chart showing another example of a carrier wave and a voltage command wave used in the first embodiment.

At S140, the voltage command wave VS is corrected to a voltage command wave VSa by using the following equations (3) to (5) as shown in FIG. 4. The voltage command wave VSa is also formed of a U-phase voltage command wave VUa, a V-phase voltage command wave Wa and a W-phase command voltage wave VWa.

$$VUa = VU + \Delta V \quad (3)$$

$$Wa = W + \Delta V \quad (4)$$

$$VWa = VW + \Delta V \quad (5)$$

Thus, the voltage command wave VSa is calculated by offsetting the reference potential of the voltage command wave VS from the reference potential of the carrier wave Ka to the maximum value side of the carrier wave Ka. The voltage command wave VSa is a first voltage command wave of each phase, and has the same period and the same amplitude as the voltage command wave VS. The voltage command wave VSa has the same maximum value or peak value as that of the carrier wave Ka. The reference potential of the voltage command wave VSa is a first reference potential.

At S150, a control signal for the inverter circuit 20 are determined and outputted by using the voltage command wave VSa.

Specifically, the voltage command wave VSa is compared with the carrier wave Ka with respect to each phase to determine which one of the transistors SW1 to SW6 is to be turned on.

The U-phase command voltage wave VUa is for the transistors SW3 and SW6. When the U-phase voltage command wave VUa is greater than the carrier wave Ka, the transistor SW3 is turned on and the transistor SW6 is turned off. When the U-phase voltage command wave VU is less than the carrier wave Ka, the transistor SW3 is turned off and the transistor SW 6 is turned on.

The V-phase command voltage wave Wa is for the transistors SW2 and SW5. In the similar manner as in the case of the U-phase voltage command wave VUa, one and the other of the transistor SW2 and the transistor SW5 is turned off and on, respectively, based on comparison of the V-phase voltage command wave Wa and the carrier Wave Ka.

Further, in the similar manner, one and the other of the transistor SW1 and the transistor SW4 is turned off and on, respectively, based on comparison of the W-phase voltage command wave VWa and the carrier wave Ka.

Thus it is determined which one of the transistors SW1 to SW6 is turned on, and the control signal for such control is outputted.

If the voltage vector magnitude Vx of the voltage command wave VS is greater than the peak value VB of the carrier wave Ka (S120: NO), the voltage command wave VS is compared with the carrier wave Ka with respect to each phase at S150 to determine which one of the transistors SW1 to SW6 is to be turned on. The control signal corresponding to this determination is outputted to the inverter circuit 20 as described above.

After S150, the foregoing processing is repeated again from S100.

With the control signals applied to the inverter circuit 20, the transistors SW1 to SW6 perform respective switching operations. As a result, the three-phase AC currents flow from the common junctions T1, T2 and T3 to the stator coil 1, respectively.

Since the phase coils 1a, 1b and 1c are energized in turn, the stator coil 1 responsively generates a rotating magnetic field, so that the rotor is rotated in timed relation with the rotating magnetic field.

By the switching operations of the transistors SW4 to SW6, the capacitor 30 is charged.

For example, when the transistor SW4 is turned on, a current flows from the DC power source 3 to the ground through the neutral point 1x, the W-phase coil 1c and the transistor SW4. The W-phase coil 1c stores energy therein at this moment. When the transistor SW4 is turned off thereafter, the stored energy is discharged to cause a flow of current to the positive bus line 22 through the diode D1.

That is, when the transistor SW4 is turned off, the current flows from the W-phase coil 1c to the positive bus line 22 bypassing the transistor SW1. This current flows into the positive electrode of the capacitor 30 as a charging current, thereby charging the capacitor 30.

According to the first embodiment, the inverter control circuit 50 controls the transistors SW1 to SW6 based on results of comparison of the voltage command wave VSa and the carrier wave Ka, when the voltage vector magnitude Vx of the voltage command wave VS is less than the peak value VB of the carrier wave Ka.

If the inverter control circuit 50 uses the voltage command wave VS (FIG. 3), which changes around the zero potential, in controlling the transistors SW1 to SW6, the turn-on period of the transistors SW1 to SW3 and the turn-on period of the transistors SW4 to SW6 become equal to each other.

However, the control circuit 50 of the first embodiment uses the voltage command wave VSa (FIG. 4), which is corrected in the positive potential side, the on-period of the transistors SW4 to SW6 becomes shorter than that of the transistors SW1 to SW3.

As a result, the period in which the stator coil 1 stores energy therein is made shorter than in the case that the voltage command wave VS is used. The energy stored in the stator coil 1 is thus reduced, and the electric charge stored in the capacitor 30 at the time of turning off the transistors SW4 to SW6 can be reduced.

As described above, when the voltage vector magnitude Vx is less than the peak value VB of the carrier wave Ka, the electric charge stored in the capacitor 30 can be reduced than in the case of controlling the transistors SW1 to SW6 by using the voltage command wave VS. Therefore, the thermal loss caused by the stator coil 1 can be reduced. In addition, since the current, which flows in the diodes D1 to D3, becomes smaller, the thermal loss of the diodes D1 to D3 can also be reduced. Thus, the efficiency of controlling the motor is improved.

In the first embodiment, the voltage command wave VSa is determined by being offset to have the same maximum value as that of the peak value of the carrier wave Ka. However, the voltage command wave VSa may be determined to have other maximum values. For example, by offsetting the reference potential of the voltage command wave VSa to be higher than the reference potential of the carrier wave Ka, the reference potential of the voltage command wave VSa may be offset to any potential, which is between the reference potential of the voltage command wave VSa and the peak value of the carrier wave Ka.

Figure 5:
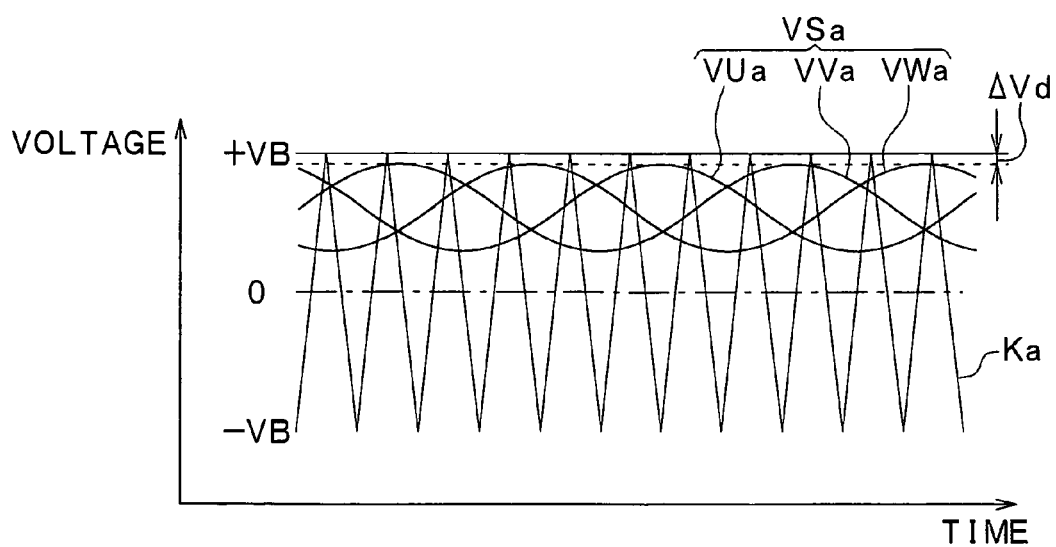
FIG. 5 is a time chart showing a further example of a carrier wave and a voltage command wave used in a modification of the first embodiment.

For example, as shown in FIG. 5, the voltage command wave VSa may be set to have a maximum value, which is slightly less than the peak value of the carrier wave Ka by a predetermined amount ΔVd.

In the case of the voltage command wave VSa shown in FIG. 4, the peak value of the carrier wave Ka becomes equal to the voltage command wave VSa periodically. At this time point, the check result of S120 becomes unstable, and control hunting is possibly caused.

However, in the case of the voltage command wave VSa shown in FIG. 5, the peak value of the carrier wave Ka will not become equal to the voltage command wave VSa. As a result, the check operation at S120 can be executed stably.

Second Embodiment

Figure 6:
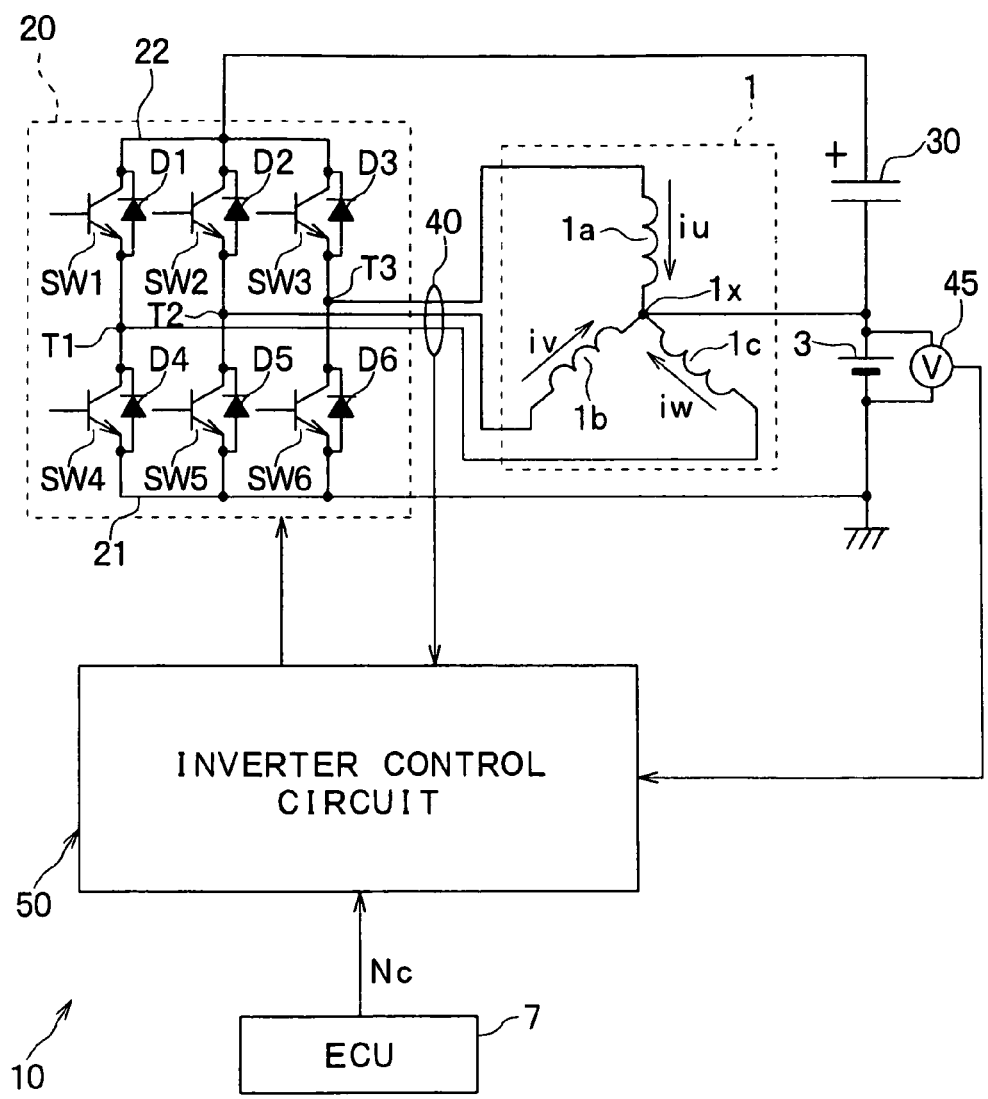
FIG. 6 is a circuit diagram showing a driving apparatus for a three-phase AC synchronous motor according to a second embodiment of the present invention.

In a second embodiment, as shown in FIG. 6, the capacitor 30 is connected between the positive bus line 22 and the positive electrode of the DC power source 3, which is the neutral point 1x of the stator coil 1.

The inverter circuit 20 and the inverter control circuit 50 are configured in the similar manner as in the first embodiment. Therefore, the similar operation and the similar advantage are provided in the second embodiment as in the first embodiment.

Third Embodiment

Figure 7:
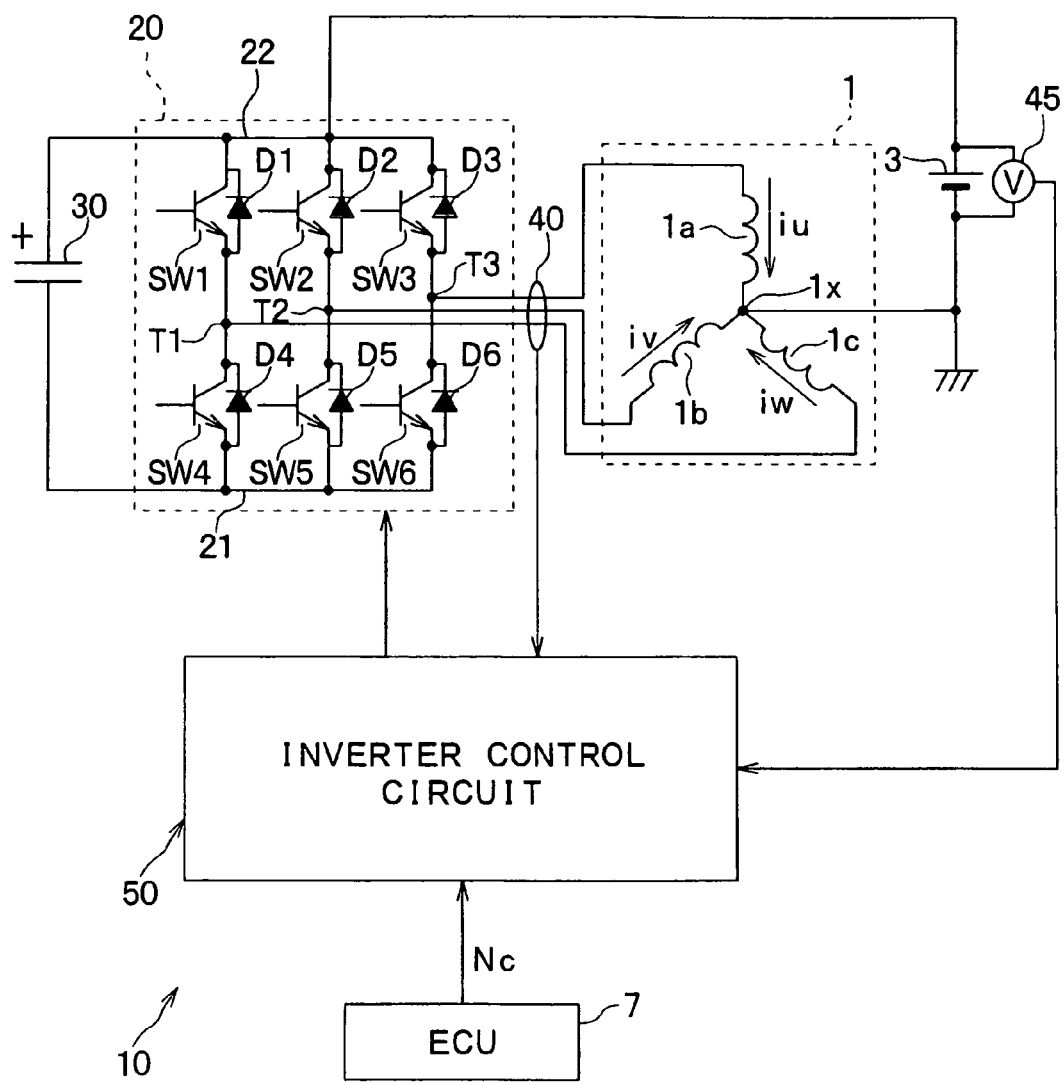
FIG. 7 is a circuit diagram showing a driving apparatus for a three-phase AC synchronous motor according to a third embodiment of the present invention.

In a third embodiment, as shown in FIG. 7, the DC power source 3 is connected between the positive bus line 22 and the neutral point 1x of the stator coil 1.

The neutral point 1x is grounded together with the DC power source 3. When the transistors SW1 to SW6 are controlled to perform the switching operation, the three-phase AC currents flow from the common junctions T1, T2 and T3 to the stator coil 1 based on the output voltage of the DC power source 3 and the output voltage of the capacitor 30.

In addition, due to the switching operation of the transistors SW1 to SW3, the capacitor 30 is charged.

For example, when the transistor SW2 is turned on and the transistor SW5 is turned off, a current iv flows from the positive electrode of the DC power source 3 to the neutral point 1x through the positive bus line 22, the transistor SW2 and the V-phase coil 1b. Thus, energy is stored in the stator coil 1.

When the transistor SW2 is turned off, the energy stored in the stator coil 1 is discharged so that a current flows from the negative electrode of the capacitor 30 to the V-phase coil 1b of the stator coil 1 through the negative bus line 21 and the diode D5.

That is, when the transistor SW2 is turned off, the energy of the stator coil 1 is discharged as the current, which flows from the negative electrode of the capacitor 30 to the V-phase coil 1b of the stator coil 1 bypassing the transistor SW5. Thus, the capacitor 30 is charged.

The inverter control circuit 50 is configured in the similar manner as in the first embodiment to execute the PWM control processing as shown in FIG. 2.

Figure 8:
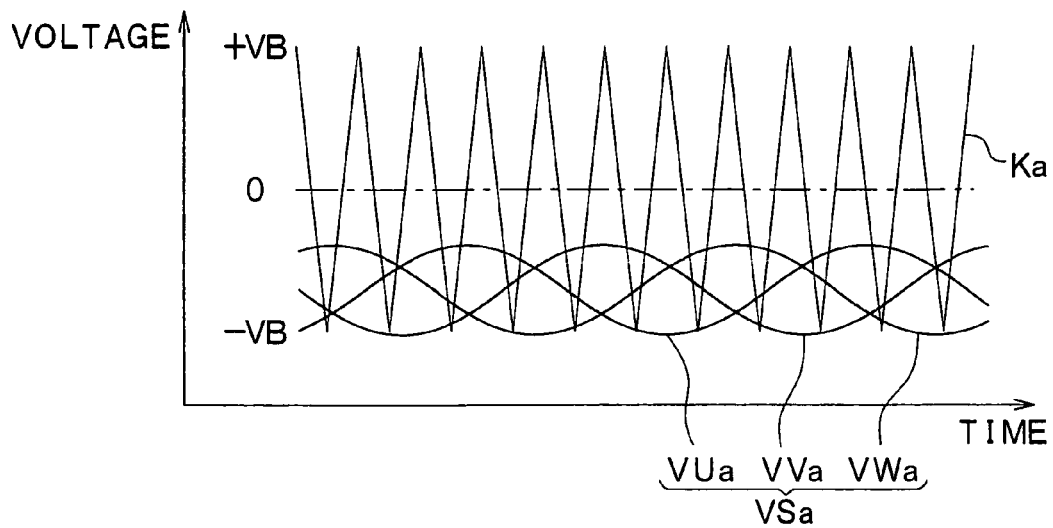
FIG. 8 is a time chart showing a carrier wave and a voltage command wave used in the third embodiment.

However, in the third embodiment, the voltage command wave VSa shown in FIG. 8 is used in place of that shown in FIG. 4. As understood from FIG. 8, the voltage command wave VSa is the first voltage command wave of each phase, and is the three-phase sine-wave, which periodically varies its magnitude from the reference potential to the positive side and the negative side alternately. This voltage command wave VSa is determined by being offset to a negative side, so that its reference potential is less than the reference potential (zero) of the carrier wave Ka and a minimum value of the voltage command value VSa becomes equal to a negative peak value (minimum value) of the carrier wave Ka.

Since the inverter control circuit 50 controls the inverter circuit 20 by using the voltage command wave VSa shown in FIG. 8, the on-period of the transistors SW1 to SW3 is made shorter than that of the transistors SW4 to SW6.

As a result, the energy, which is stored in the stator coil 1 due to the turn-on of the transistors SW1 to SW3, is reduced in comparison with the case of using the voltage command wave VS shown in FIG. 3. The thermal loss of the stator coil 1 can thus be reduced.

In addition, the electric charge stored in the capacitor 30 at the time of turn-off of the transistors SW1 to SW3 can be reduced. When the electric charge is stored in the capacitor 30, a current, which flows in the diodes D4 to D6, can be reduced. Therefore, the thermal loss of the diodes D4 to D6 can be reduced, and hence the efficiency of driving the motor can be improved as in the first embodiment.

In the third embodiment, the voltage command wave VSa is determined by being offset to have the same minimum value as the minimum value −VB of the carrier wave Ka. However, the voltage command wave VSa may be offset to have other minimum values. For example, by offsetting the reference potential of the voltage command wave VSa to be lower than the reference potential of the carrier wave Ka, the reference potential of the voltage command wave VSa may be offset to any potential, which is between the reference potential of the voltage command wave VSa and the minimum value of the carrier wave Ka.

Figure 9:
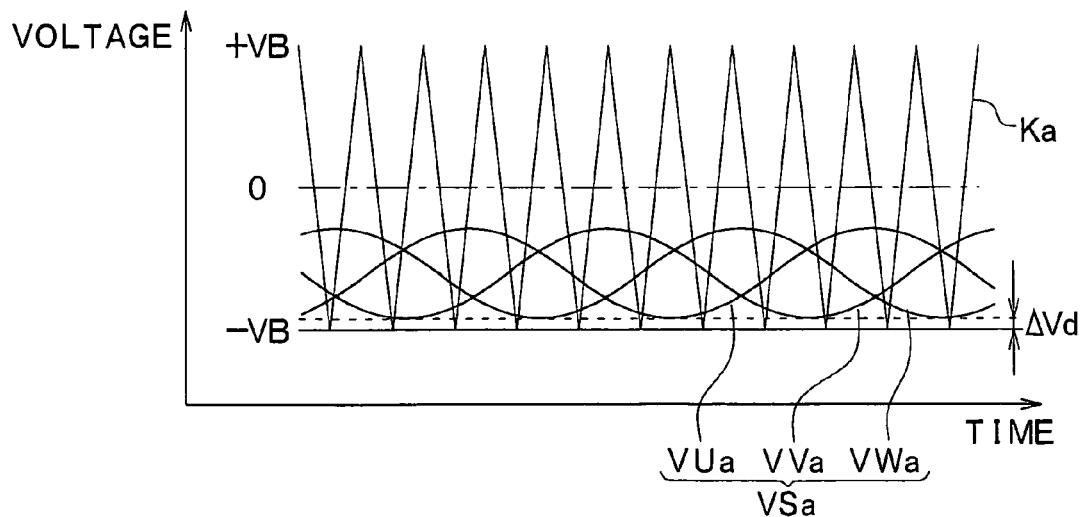
FIG. 9 is a time chart showing a carrier wave and a voltage command wave used in a modification of the third embodiment.

For example, as shown in FIG. 9, the voltage command wave VSa may be set to have a minimum value, which is slightly greater than the minimum value of the carrier wave Ka by a predetermined amount ΔVd.

Fourth Embodiment

Figure 10:
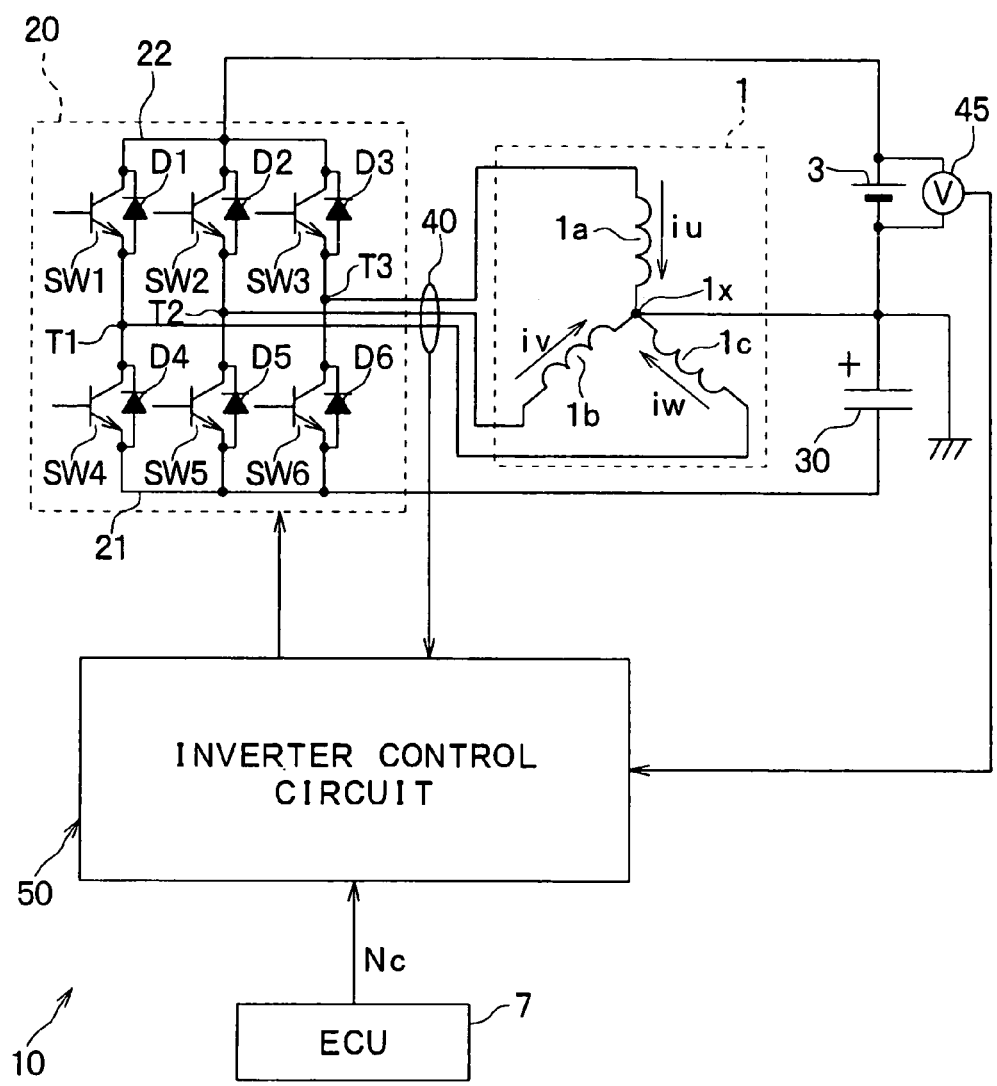
FIG. 10 is a circuit diagram showing a driving apparatus for a three-phase AC synchronous motor according to a fourth embodiment of the present invention.

In a fourth embodiment, as shown in FIG. 10, the DC power source 3 is connected in the similar manner as in the third embodiment but the capacitor 30 is connected between the neutral point 1x of the stator coil 1 and the negative bus line 21. That is, the positive electrode and the negative electrode of the capacitor 30 is connected to the neutral point 1x, which is grounded, and the negative bus line 21, respectively.

The inverter circuit 20 and the inverter control circuit 50 are configured and perform the PWM control processing in the similar manner as in the third embodiment.

Fifth Embodiment

In the first embodiment, the inverter control circuit 50 is configured to calculate the corrective value ΔV at S130, each time the voltage command wave VSa is calculated at S100. In a fifth embodiment, however, the corrective value ΔV is pre-stored in a memory with respect to each output power Pout of the motor and the voltage command wave VSa is determined by using the stored corrective value ΔV.

Figures 11, 12:
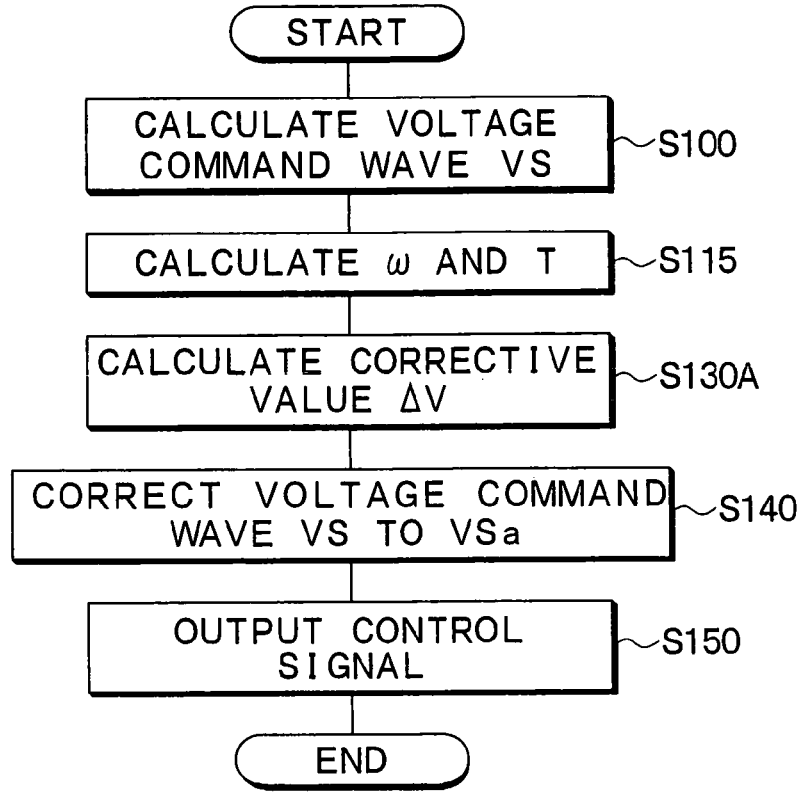
FIG. 11 is a flowchart showing control processing executed by a control circuit in a fifth embodiment of the present invention.
FIG. 12 is a table showing map data used in the control processing shown in FIG. 11.

The inverter control circuit 50 therefore executes the PWM control processing as shown in FIG. 11.

Specifically, after the voltage command wave VS is calculated at S100 as in the first embodiment, an angular velocity w and a torque T generated by the rotor are calculated at S115 based on the currents detected by the current sensors 40. The torque T is calculated as follows.

$$T = Kt \times iq,$$

wherein Kt is a torque coefficient, iq is a q-axis current of the rotating coordinate system. The current iq is calculated by converting the detection value of the current sensor 40 from the three-phase fixed coordinate system and the rotating coordinate system.

At S130A, the corrective value ΔV is determined by referring to a table of mapped data shown in FIG. 12.

In the example of FIG. 12, corrective values ΔV1 to ΔV20 are provided, and each corrective value correspond to a combination of one of angular velocity ω1 to ω4 and one of torque T1 to T5.

For example, the angular velocity ω and the torque T calculated at S115 are ω2 and T3, the corrective value is determined to be ΔV8.

Using the corrective value ΔV, the voltage command wave VS is corrected to VSa at 5140.

At 5150, the control signal for controlling the transistors SW1 to SW6 is determined by comparison of the voltage command wave VSa and the carrier wave Ka, and the control signal is outputted to the inverter circuit 20.

The corrective value ΔV is determined based on the angular velocity ω and the torque T for the following reason.

The output power Pout of the motor is determined as Pout=T×ω. In driving the motor, the output power is produced by inputting the voltage command wave.

Since the output power thus corresponds to the command voltage value in one-to-one relation, the output power also corresponds to the corrective value ΔV in one-to-one relation. Therefore, the corrective value ΔV can be determined from angular velocity ω and torque T Sixth Embodiment In a sixth embodiment shown in FIGS. 13 to 15, to shorten the on-period of the transistors SW4 to SW6, the voltage command wave VS is offset so that the maximum value VLmax of the voltage command wave VSa becomes greater than the maximum value VB of the carrier wave Ka as shown in FIG. 14.

Figure 13:
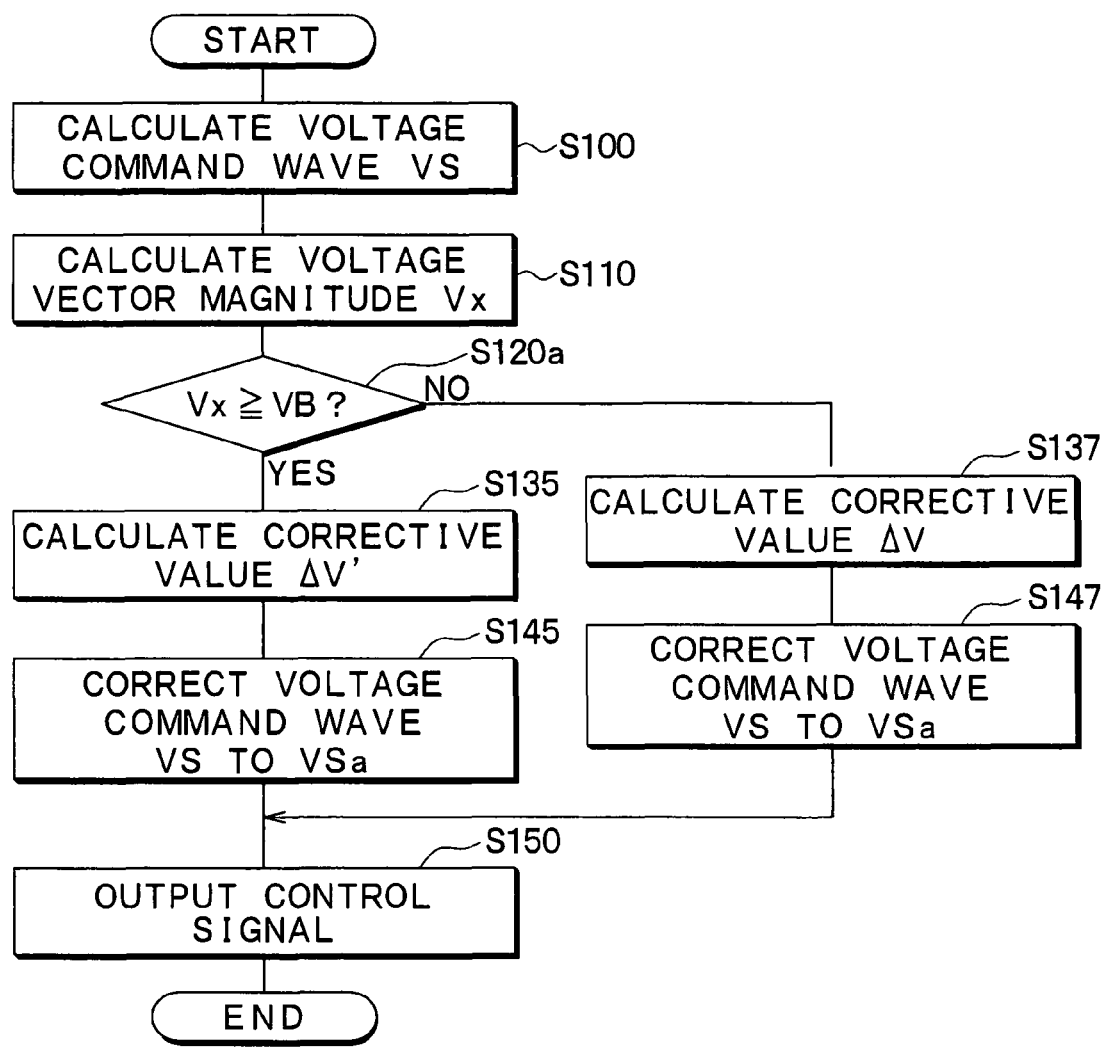
FIG. 13 is a flowchart showing control processing of a control circuit in a sixth embodiment of the present invention.
Figure 14:
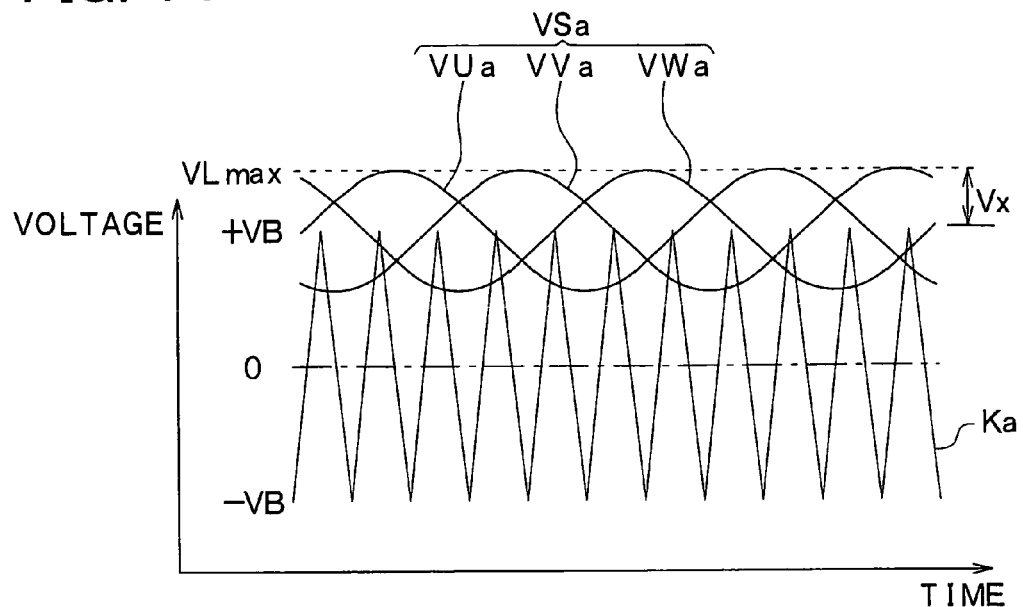
FIG. 14 is a time chart showing one example of a carrier wave and a voltage command wave used in the sixth embodiment.

The inverter control circuit 50 is configured to perform the PWM control processing shown in FIG. 13, so that the inverter circuit 20 is controlled by using the voltage command wave VSa, the maximum value VLmax of which is greater than that of the carrier wave Ka.

The voltage command wave VS, specifically second voltage command waves VU, W and VW of three phases, are calculated at S100 based on the target rotation speed Nc. The voltage vector magnitude Vx of the voltage command wave VS is set at S110 to become greater as the rotation speed Na increases.

The voltage command wave VSa is determined by offsetting the voltage command wave VS to the positive side, that is, to the higher potential side, at the following S120a to S147.

It is noted that, if the voltage vector magnitude Vx of the voltage command wave VSa is greater than the maximum value VB of the carrier wave Ka, the DC power source voltage is insufficient and the output voltage is saturated in comparison with the case that the voltage vector magnitude Vx of the voltage command wave VSa is less than the maximum value VB of the carrier wave Ka. As a result, the linearity of the voltage outputted to the stator coil 1 from the inverter circuit 20 is degraded.

Therefore, as described below, the maximum value of the voltage command wave VSa is varied in dependence on whether the voltage vector magnitude Vx of the voltage command wave VSa is less or greater than the maximum value +VB of the carrier wave Ka. Thus, linearity of the voltage outputted to the stator coil 1 from the inverter circuit 20 is suppressed from degradation and maintained.

For this reason, at S120a, it is checked whether the voltage vector magnitude. Vx of the voltage command wave VS is greater than the maximum value of the carrier wave Ka.

If the voltage vector magnitude Vx is less than the maximum value VB of the carrier wave Ka (S120a: NO), a corrective value ΔV is calculated at S137 thereby to offset the voltage command wave VS to the positive side. This corrective value ΔV is calculated by the following equation (6), in which VLmax is an allowable upper limit of the maximum value of the voltage command wave VSa.

$$\Delta V = VL\text{max} - Vx \quad (6)$$

At S147, the voltage command wave VS is corrected to the voltage command wave VSa as follows by using the corrective value ΔV. The voltage command wave VSa is the first voltage command wave, which is formed of the command waves VUa, Wa and VWa of the U, V and W-phases.

$$VUa = VU + \Delta V \quad (7)$$

$$Wa = VV + \Delta V \quad (8)$$

$$VWa = VW + \Delta V \quad (9)$$

By correcting the voltage command wave VS by using the corrective value ΔV, the voltage command wave VSa having the maximum value, which is greater than the maximum value VB of the carrier wave Ka, is determined as shown in FIG. 14.

The voltage command wave VSa has the same cycle period and amplitude as those of the command voltage VS. The maximum value of the voltage command wave VSa is limited to the upper limit value VLmax.

If the voltage vector magnitude Vx of the voltage command wave VS is equal to or greater than the peak value of the carrier wave Ka (S120a: YES), a corrective value ΔV' is calculated at S135 to suppress degradation of linearity of the voltage command wave VSa by using the equation (10).

$$\Delta V' = VL\text{max} - Vx - \Delta Vd \quad (10)$$

ΔVd is a corrective value predetermined as an offset value between the maximum value of the voltage command wave VS and the upper limit value VLmax.

At S145, the voltage command wave VS is corrected to the voltage command wave VSa as follows by using the corrective value ΔV'. The voltage command wave VSa is formed of the command waves VUa, Wa and VWa of the U, V and W-phases.

$$VUa = VU + \Delta V' \quad (11)$$

$$Wa = W + \Delta V' \quad (12)$$

$$VWa = VW + \Delta V' \quad (13)$$

Figure 15:
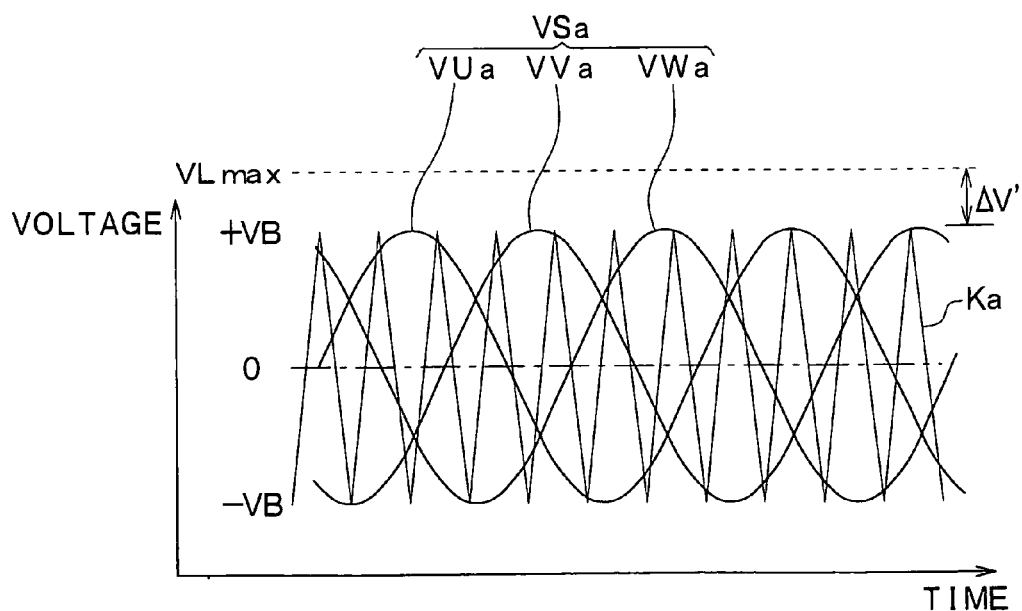
FIG. 15 is a time chart showing another example of a carrier wave and a voltage command wave used in the sixth embodiment.

By thus correcting the voltage command wave VS by using the corrective value ΔV', as shown in FIG. 15, the voltage command wave VSa is determined to have the maximum value, which is less than the upper limit value VLmax by an amount of ΔV'.

That is, in comparison to the voltage command wave VSa determined at S145, the voltage command wave VSa is determined as a third voltage command wave by being offset to the maximum value side of the carrier wave Ka.

As shown in FIG. 15, the maximum value of the voltage command wave VSa is equal to the maximum value of the carrier wave Ka.

If the voltage vector magnitude Vx of the voltage command wave VS is greater than the peak value of the carrier wave Ka, the maximum value of the voltage command wave VSa becomes less than in a case that the voltage vector magnitude Vx of the voltage command wave VS is less than the peak value of the carrier wave.

After S145 or S147, at S150, the control signal for the inverter circuit 20 is determined by comparison of the voltage command wave VSa with the carrier wave Ka.

The transistors SW1 to SW6 of the inverter circuit 20 are controlled by the control signals to perform the switching operations, so that the three-phase AC currents flow from the common junctions T1, T2 and T3 to the stator coil 1.

The capacitor 30 is thus charged as in the first embodiment in correspondence to the switching operations of the transistors SW4 to SW6.

In the sixth embodiment, the inverter control circuit 50 controls the inverter circuit 20 by using the voltage command wave VSa, which has the maximum value greater than that VB of the carrier wave Ka.

As a result, the period, in which the transistors SW4 to SW6 are turned on and the transistors SW1 to SW3 are turned off, is made shorter than in the first embodiment. The charge stored in the capacitor 30 by the turn-off of the transistors SW4 to SW6 is reduced more and the efficiency of driving the motor is improved more than in the first embodiment.

Further, if the voltage vector magnitude Vx of the voltage command wave is greater than the maximum value of the carrier wave Ka, the voltage command wave VSa is offset more to the negative voltage side than in the case that the voltage vector magnitude Vx of the voltage command wave VSa is less than the peak value of the carrier wave Ka. Thus, the linearity of the voltage outputted to the stator coil 1 from the inverter circuit 20 is suppressed from being degraded.

The sixth embodiment, in which the capacitor 30 is connected between the bus lines 21 and 22 and the maximum value of the voltage command wave VSa is greater than the carrier wave ka, may be modified in such a way that the capacitor 30 is connected between the neutral point 1x and the positive bus line 22 and the voltage command wave VSa is determined to have the maximum value greater than the carrier wave Ka.

Seventh Embodiment

Figure 16:
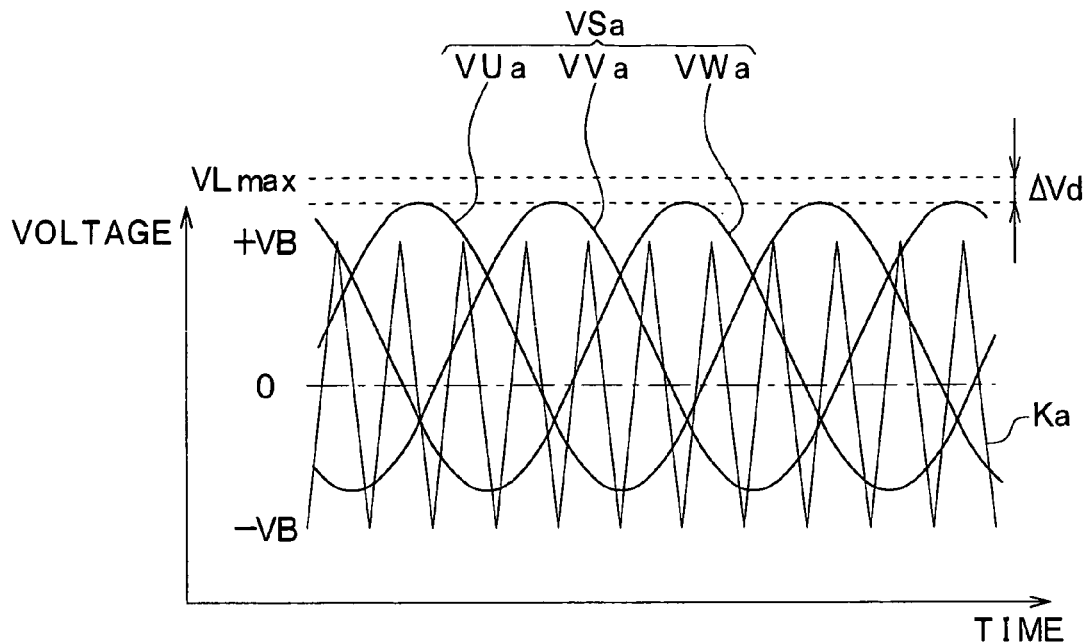
FIG. 16 is a flowchart showing control processing executed by a control circuit in a seventh embodiment of the present invention.

In a seventh embodiment, as shown in FIG. 16, the voltage command wave VSa is determined to have its maximum value, which is less than the upper limit value VLmax by an amount of ΔVd, in contrast to the sixth embodiment in which the maximum value of the voltage command wave Vsa is determined to be equal to the upper limit value VLmax (FIG. 14).

When the voltage command wave VSa has the maximum value being greater than the carrier wave Ka, the charge stored in the capacitor 30 is reduced and hence the output voltage of the capacitor 30 is reduced. It is likely that the driving operation of the motor becomes unstable due to external disturbance such as changes in the load, if the charge stored in the capacitor 30 is insufficient.

Therefore, in the seventh embodiment, the maximum value of the voltage command wave VSa is set to be equal to a value, which is less than the upper limit value VLmax by the amount ΔVd. As a result, the capacitor 30 can store a sufficient amount of charge therein so that the motor can be driven stably against external disturbances.

The seventh embodiment may be modified in such a way that the capacitor 30 is connected between the neutral point 1x and the positive bus line 22 as shown in FIG. 6 and the voltage command wave VSa is set to have the maximum value, which is less than the upper limit value VLmax by the amount ΔVd.

Eighth Embodiment

In an eighth embodiment, the DC power source 3 is connected between the neutral point 1x and the positive bus line 22 contrary to the sixth embodiment, in which the DC power source 3 is connected between the neutral point 1x and the negative bus line 21.

In the eighth embodiment, the driving apparatus 10 is configured as shown in FIG. 7 (third embodiment), and the inverter control circuit 50 performs the PWM control processing as shown in FIG. 13 (sixth embodiment).

The PWM control processing of the inverter control circuit 50 in the eighth embodiment is different from that of the first embodiment as follows.

If the voltage vector magnitude Vx of the voltage command wave VSa is greater than the peak value VB of the carrier wave Ka, the power source voltage becomes insufficient and the output voltage is saturated than in the case that the voltage vector magnitude Vx is less than the peak value VB of the carrier wave Ka. In this case, the linearity of the voltages outputted to the inverter circuit 20 to the stator coil 1 is degraded.

Therefore, the inverter control circuit 50 in the eighth embodiment uses different voltage command waves VSa between cases, depending on whether the voltage vector magnitude of the voltage command wave VS is greater or less than the maximum value of the carrier wave Ka.

Specifically, it the voltage vector magnitude Vx of the voltage command wave VS is less than the peak value of the carrier wave Ka (S120a: NO), the voltage command wave VSa is determined as shown in FIG. 17 at S137 and S147.

Figure 17:
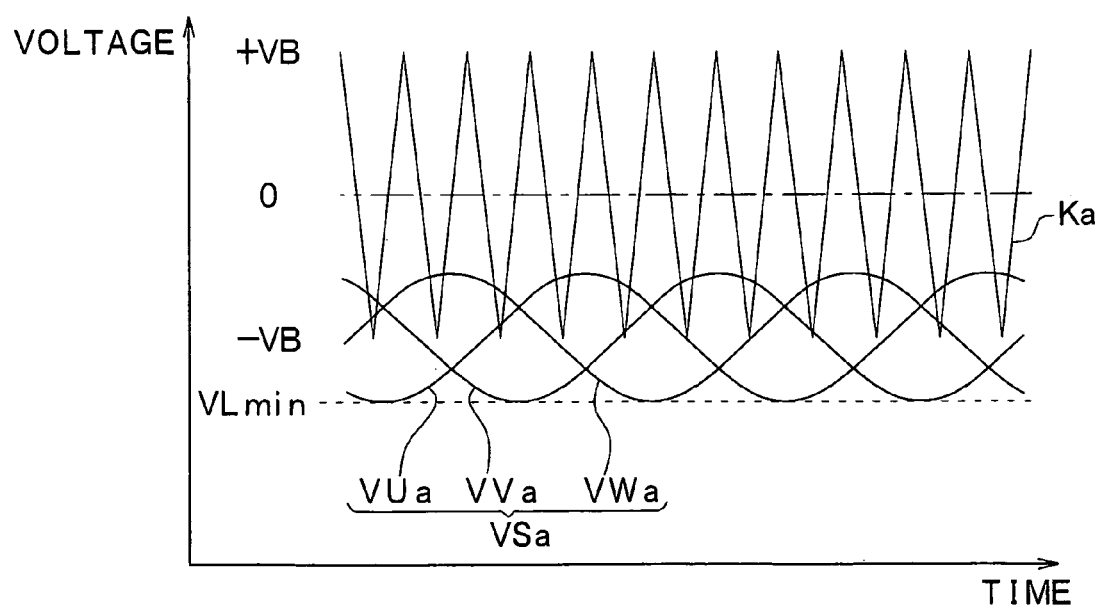
FIG. 17 is a time chart showing one example of a carrier wave and a voltage command wave used in an eighth embodiment of the present invention.

The voltage command wave VSa shown in FIG. 17 has a minimum value, which is less than the carrier wave Ka and is set to equal to a lower limit value VLmin. This lower limit value VLmin is predetermined as a lowest possible value of the voltage command wave VSa.

By controlling the inverter circuit 20 based on the voltage command wave VSa shown in FIG. 17, the off-period in which the transistors SW1 to SW3 are turned off and the on-period in which the transistors SW4 to SW6 are turned on become longer than in the case of the third embodiment. Therefore, the energy stored in the stator coil 1 at the time of turn-on of the transistors SW1 to SW3 is reduced. Thus the thermal loss of the stator coil 1 can be reduced.

Further, the charge stored in the capacitor 30 at the time of turn-off of the transistors SW1 to SW3 can be reduced. When the charge is stored in the capacitor 30, the current flowing in the diodes D4 to D6 can be reduced, and hence the thermal loss of the diodes D4 to D6 can be reduced.

The efficiency of driving the motor can thus be improved in comparison to the third embodiment.

Figure 18:
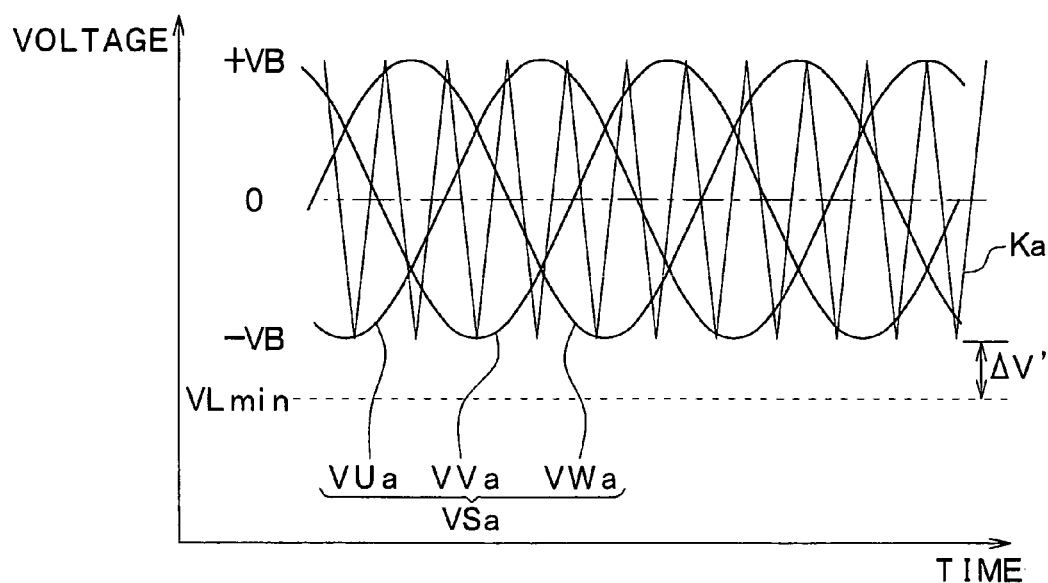
FIG. 18 is a time chart showing another example of a carrier wave and a voltage command wave used in the eighth embodiment.

If the voltage vector magnitude Vx of the voltage command wave VS is greater than the peak value of the carrier wave Ka (S120a: YES), the voltage command wave VSa is determined as the third voltage command wave as shown in FIG. 18 at S135 and S145. This voltage command wave VSa has a minimum value, which is greater than the lower limit value VLmin by the corrective value ΔV'. The corrective value ΔV' is predetermined as an offset value between the minimum value of the voltage command wave VS and the lower limit value VLmin.

Thus, the voltage command wave VSa determined at S137 and S147 is corrected by being offset to the minimum value side of the carrier wave Ka.

As a result, if the voltage vector magnitude Vx of the voltage command wave VS is greater than the peak value of the carrier wave Ka, the voltage command wave VSa is determined so that its minimum value becomes greater than in the case that the voltage vector magnitude Vx is less than the peak value of the carrier wave Ka. The linearity of the voltage outputted to the stator coil 1 from the inverter circuit 20 is thus maintained.

The eighth embodiment may be modified in such a way that the capacitor 30 is connected between the neutral point 1x and the positive bus line 22 and the inverter circuit 20 is controlled by using the voltage command wave VSa having a minimum value less than the carrier wave Ka.

Ninth Embodiment

Figure 19:
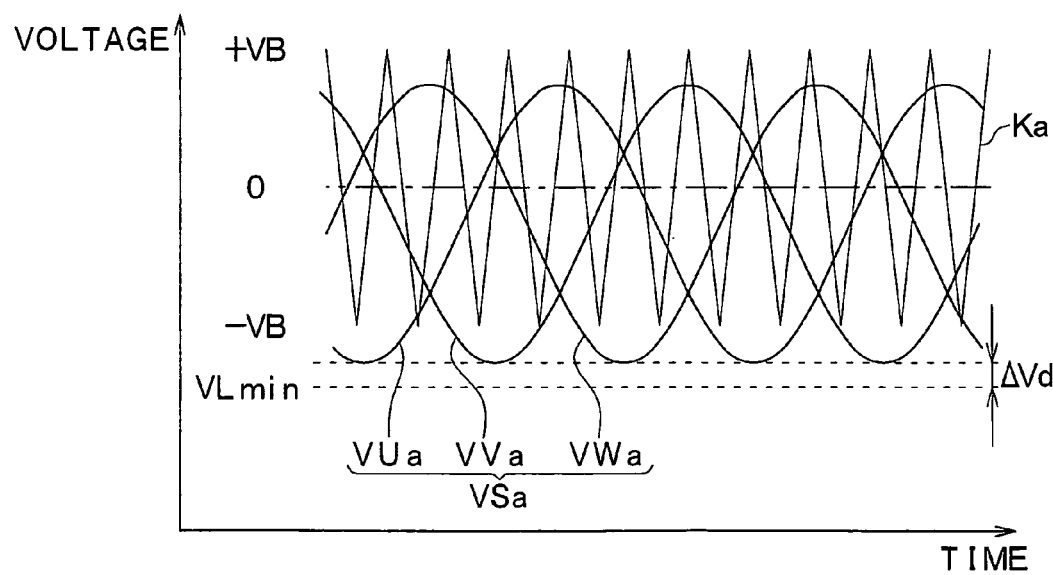
FIG. 19 is a time chart showing a carrier wave and a voltage command wave used in a ninth embodiment of the present invention.

In a ninth embodiment, as shown in FIG. 19, the voltage command wave VSa is determined to have its minimum value, which is greater than the lower limit value VLmin by a predetermined value ΔVd. By using this voltage command wave VSa, the ninth embodiment can attain the similar advantage as the seventh embodiment.

The ninth embodiment may be modified such that the capacitor 30 is connected between the neutral point 1x of the stator coil 1 and the positive bus line 22, and the voltage command wave VSa is set to have a minimum value, which is greater than the lower limit value VLmin by the predetermined value ΔVd.

In the foregoing embodiments, a triangular wave periodically changing in magnitude in the positive direction and the negative direction from the reference potential is exemplarily used. However, other waves such as a saw-tooth wave, which periodically changes in the positive direction and the negative direction, may alternatively be used.

In addition, the embodiments may be modified to control a multi-phase AC synchronous motor of four or more phases other than the motor.

What is claimed is:

1. A driving apparatus for a multi-phase AC synchronous motor having a stator coil, which is star-connected to a neutral point to generate a rotating magnetic field to rotate a rotor, the driving apparatus comprising:

an inverter circuit having a plurality of pairs of switching elements in correspondence to the number of phases of the motor, each pair of switching elements including a positive-side switching element connected to a positive bus line and a negative-side switching element connected to a negative bus line and connected to each other in series, and the plurality of pairs of switching elements being connected in parallel one another between the positive bus line and the negative bus line;

a capacitor having a positive electrode and a negative electrode, the positive electrode being connected to the positive bus line, and the negative electrode being connected to either one of the negative bus line and the neutral point; and an inverter control circuit configured to turn on the positive-side switching element and turn off the negative-side switching element in each pair when a first command wave of each phase is greater than a carrier wave, and turn on the negative-side switching element and turn off the positive-side switching element in each pair when the first command wave of each phase is less than the carrier wave, the first command wave having a magnitude periodically changing from a first reference level to a positive side and a negative side, and the carrier wave having a magnitude periodically changing from a second reference level to the positive side and the negative side, the inverter control circuit being configured to output, by turning on and off the pair of switching elements, an AC current to the stator coil to generate the rotating magnetic field from the stator coil based on an output voltage of the DC power source and an output voltage of the capacitor, the inverter control circuit being configured to turn on the negative-side switching element to store energy in the stator coil by a current flowing from the DC power source to the stator coil, and turn off the negative-side switching element to charge the capacitor by the energy of the stator coil, which flows as a current flowing from the stator coil to the positive electrode of the capacitor bypassing the positive-side switching element, and the inverter control circuit being configured to offset the first reference level of the first command wave of each phase to be closer to a maximum value of the carrier wave than the second reference level is, so that a turn-on period of the negative-side switching element becomes shorter than a turn-on period of the positive-side switching element.

2. The driving apparatus according to claim 1, wherein:
the inverter control circuit is configured to set the first command wave to have a maximum value, which is equal to a maximum value of the carrier wave.

3. The driving apparatus according to claim 1, wherein:
the inverter control circuit is configured to set the first command wave to have a maximum value, which is less than a maximum value of the carrier wave by a predetermined value.

4. The driving apparatus according to claim 1, wherein:
the inverter control circuit is configured to set a second command wave of each phase, which periodically changes to a positive side and a negative side from a reference level, which is equal to the second reference level of the carrier wave, and set the first command wave by offsetting the reference level of the second command wave to be closer to the maximum value of the carrier wave than the second reference level of the carrier wave is; and the inverter control circuit is configured to check whether a vector magnitude of the second command wave is less than the maximum value of the carrier wave, output the AC current to the stator coil by turning on and off the pair of switching elements based on comparison of the first command wave with the carrier wave when the vector magnitude of the second command wave is less than the maximum value of the carrier wave, and output the AC current to the stator coil by turning on and off the pair of switching elements based on comparison of the second command wave with the carrier wave when the vector magnitude of the second command wave is greater than the maximum value of the carrier wave.

5. A driving apparatus for a multi-phase AC synchronous motor having a stator coil, which is star-connected to a neutral point to generate a rotating magnetic field to rotate a rotor, the driving apparatus comprising:
- an inverter circuit having a plurality of pairs of switching elements in correspondence to the number of phases of the motor, each pair of switching elements including a positive-side switching element connected to a positive bus line and a negative-side switching element connected to a negative bus line and connected to each other in series, and the plurality of pairs of switching elements being connected in parallel one another between the positive bus line and the negative bus line;
- a capacitor having a positive electrode and a negative electrode, the positive electrode being connected to either one of the positive bus line and the neutral point, and the negative electrode being connected to the negative bus line; and
- an inverter control circuit configured to turn on the positive-side switching element and turn off the negative-side switching element in each pair when a first command wave of each phase is greater than a carrier wave, and turn on the negative-side switching element and turn off the positive-side switching element in each pair when the first command wave of each phase is less than the carrier wave, the first command wave having a magnitude periodically changing from a first reference level to a positive side and a negative side, and the carrier wave having a magnitude periodically changing from a second reference level to the positive side and the negative side,
- the inverter control circuit being configured to output, by turning on and off the pair of switching elements, an AC current to the stator coil to generate the rotating magnetic field from the stator coil based on an output voltage of the DC power source and an output voltage of the capacitor,
- the inverter control circuit being configured to turn on the positive-side switching element to store energy in the stator coil by a current flowing from the DC power source to the stator coil through the positive-side switching element, and turn off the positive-side switching element to charge the capacitor by the energy of the stator coil, which flows as a current flowing from the negative electrode of the capacitor bypassing the negative-side switching element, and
- the inverter control circuit being configured to offset the first reference level of the first command wave of each phase to be closer to a minimum value of the carrier wave than the second reference level is, so that a turn-on period of the positive-side switching element becomes shorter than a turn-on period of the negative-side switching element.

6. The driving apparatus according to claim 5, wherein:
the inverter control circuit is configured to set the first command wave to have a minimum value, which is equal to a minimum value of the carrier wave.

7. The driving apparatus according to claim 1, wherein:
the inverter control circuit is configured to set the first command wave to have a minimum value, which is greater than a minimum value of the carrier wave by a predetermined value.

8. The driving apparatus according to claim 5, wherein:
the inverter control circuit is configured to set a second command wave of each phase, which periodically changes to a positive side and a negative side from a reference level, which is equal to the second reference level of the carrier wave, and set the first command wave by offsetting the reference level of the second command wave to be closer to the minimum value of the carrier wave than the second reference level of the carrier wave is; and
the inverter control circuit is configured to check whether a vector magnitude of the second command wave is less than the maximum value of the carrier wave, output the AC current to the stator coil by turning on and off the pair of switching elements based on comparison of the first command wave with the carrier wave when the vector magnitude of the second command wave is less than the maximum value of the carrier wave, and output the AC current to the stator coil by turning on and off the pair of switching elements based on comparison of the second command wave with the carrier wave when the vector magnitude of the second command wave is greater than the maximum value of the carrier wave.

9. A driving apparatus for a multi-phase AC synchronous motor having a stator coil, which is star-connected to a neutral point to generate a rotating magnetic field to rotate a rotor, the driving apparatus comprising:
- an inverter circuit having a plurality of pairs of switching elements in correspondence to the number of phases of the motor, each pair of switching elements including a positive-side switching element connected to a positive bus line and a negative-side switching element connected to a negative bus line and connected to each other in series, and the plurality of pairs of switching elements being connected in parallel one another between the positive bus line and the negative bus line;
- a capacitor having a positive electrode and a negative electrode, the positive electrode being connected to the positive bus line, and the negative electrode being connected to either one of the negative bus line and the neutral point; and
- an inverter control circuit configured to turn on the positive-side switching element and turn off the negative-side switching element in each pair when a first command wave of each phase is greater than a carrier wave, and turn on the negative-side switching element and turn off the positive-side switching element in each pair when the first command wave of each phase is less than the carrier wave, the first command wave having a magnitude periodically changing from a first reference level to a positive side and a negative side, and the carrier wave having a magnitude periodically changing from a second reference level to the positive side and the negative side,
- the inverter control circuit being configured to output, by turning on and off the pair of switching elements, an AC current to the stator coil to generate the rotating magnetic field from the stator coil based on an output voltage of the DC power source and an output voltage of the capacitor,
- the inverter control circuit being configured to turn on the negative-side switching element to store energy in the stator coil by a current flowing from the DC power source to the stator coil, and turn off the negative-side switching element to charge the capacitor by the energy of the stator coil, which flows as a current flowing from the stator coil to the positive electrode of the capacitor bypassing the positive-side switching element, and
- the inverter control circuit being configured to offset the first command wave of each phase to have a maximum value greater than a maximum value of the carrier wave, so that a turn-on period of the negative-side switching element becomes shorter than a turn-on period of the positive-side switching element.

10. The driving apparatus according to claim 9, wherein:
the inverter control circuit is configured to set the first command wave to have the maximum value at a predetermined upper limit provided for the first command wave.

11. The driving apparatus according to claim 9, wherein:
the inverter control circuit is configured to set the first command wave to have the maximum value at a value, which is a predetermined value less than a predetermined upper limit provided for the first command wave.

12. The driving apparatus according to claim 9, wherein:
the inverter control circuit is configured to set a second command wave of each phase, which periodically changes to a positive side and a negative side from a reference level, which is equal to the second reference level of the carrier wave, set the first command wave by offsetting the second command wave to the positive side so that a maximum value of the second command wave becomes greater than the maximum value of the carrier wave, and set a third command wave by offsetting the maximum value of the first command wave in a direction of the maximum value of the carrier wave; and
the inverter control circuit is configured to check whether the maximum value of the first command wave is less than the maximum value of the carrier wave, output the AC current to the stator coil by turning on and off the pair of switching elements based on comparison of the first command wave with the carrier wave when the maximum value of the first command wave is less than the maximum value of the carrier wave, and output the AC current to the stator coil by turning on and off the pair of switching elements based on comparison of the third command wave with the carrier wave when the maximum value of the first command wave is greater than the maximum value of the carrier wave.

13. A driving apparatus for a multi-phase AC synchronous motor having a stator coil, which is star-connected to a neutral point to generate a rotating magnetic field to rotate a rotor, the driving apparatus comprising:
an inverter circuit having a plurality of pairs of switching elements in correspondence to the number of phases of the motor, each pair of switching elements including a positive-side switching element connected to a positive bus line and a negative-side switching element connected to a negative bus line and connected to each other in series, and the plurality of pairs of switching elements being connected in parallel one another between the positive bus line and the negative bus line;
a capacitor having a positive electrode and a negative electrode, the positive electrode being connected to either one of the positive bus line and the neutral point, and the negative electrode being connected to the negative bus line; and
an inverter control circuit configured to turn on the positive-side switching element and turn off the negative-side switching element in each pair when a first command wave of each phase is greater than a carrier wave, and turn on the negative-side switching element and turn off the positive-side switching element in each pair when the first command wave of each phase is less than the carrier wave, the first command wave having a magnitude periodically changing from a first reference level to a positive side and a negative side, and the carrier wave having a magnitude periodically changing from a second reference level to the positive side and the negative side,
the inverter control circuit being configured to output, by turning on and off the pair of switching elements, an AC current to the stator coil to generate the rotating magnetic field from the stator coil based on an output voltage of the DC power source and an output voltage of the capacitor,
the inverter control circuit being configured to turn on the positive-side switching element to store energy in the stator coil by a current flowing from the DC power source to the stator coil through the positive-side switching element, and turn off the positive-side switching element to charge the capacitor by the energy of the stator coil, which flows as a current flowing from the negative electrode of the capacitor bypassing the negative-side switching element, and
the inverter control circuit being configured to offset the first command wave of each phase to have a minimum value less than a minimum value of the carrier wave, so that a turn-on period of the positive-side switching element becomes shorter than a turn-on period of the negative-side switching element.

14. The driving apparatus according to claim 13, wherein:
the inverter control circuit is configured to set the first command wave to have the minimum value at a predetermined lower limit provided for the first command wave.

15. The driving apparatus according to claim 13, wherein:
the inverter control circuit is configured to set the first command wave to have the minimum value at a value, which is a predetermined value greater than a predetermined lower limit provided for the first command wave.

16. The driving apparatus according to claim 13, wherein:
the inverter control circuit is configured to set a second command wave of each phase, which periodically changes to a positive side and a negative side from a reference level, which is equal to the second reference level of the carrier wave, set the first command wave by offsetting the second command wave to the negative side so that a minimum value of the second command wave becomes less than the minimum value of the carrier wave, and set a third command wave by offsetting the minimum value of the first command wave in a direction of the minimum value of the carrier wave; and
the inverter control circuit is configured to check whether the maximum value of the first command wave is less than the maximum value of the carrier wave, output the AC current to the stator coil by turning on and off the pair of switching elements based on comparison of the first command wave with the carrier wave when the maximum value of the first command wave is less than the maximum value of the carrier wave, and output the AC current to the stator coil by turning on and off the pair of switching elements based on comparison of the third command wave with the carrier wave when the maximum value of the first command wave is greater than the maximum value of the carrier wave.

* * * * *